July 23, 1940.  F. C. FRANK  2,208,575
MASTER CYLINDER FOR BRAKES
Original Filed June 22, 1934  4 Sheets-Sheet 2

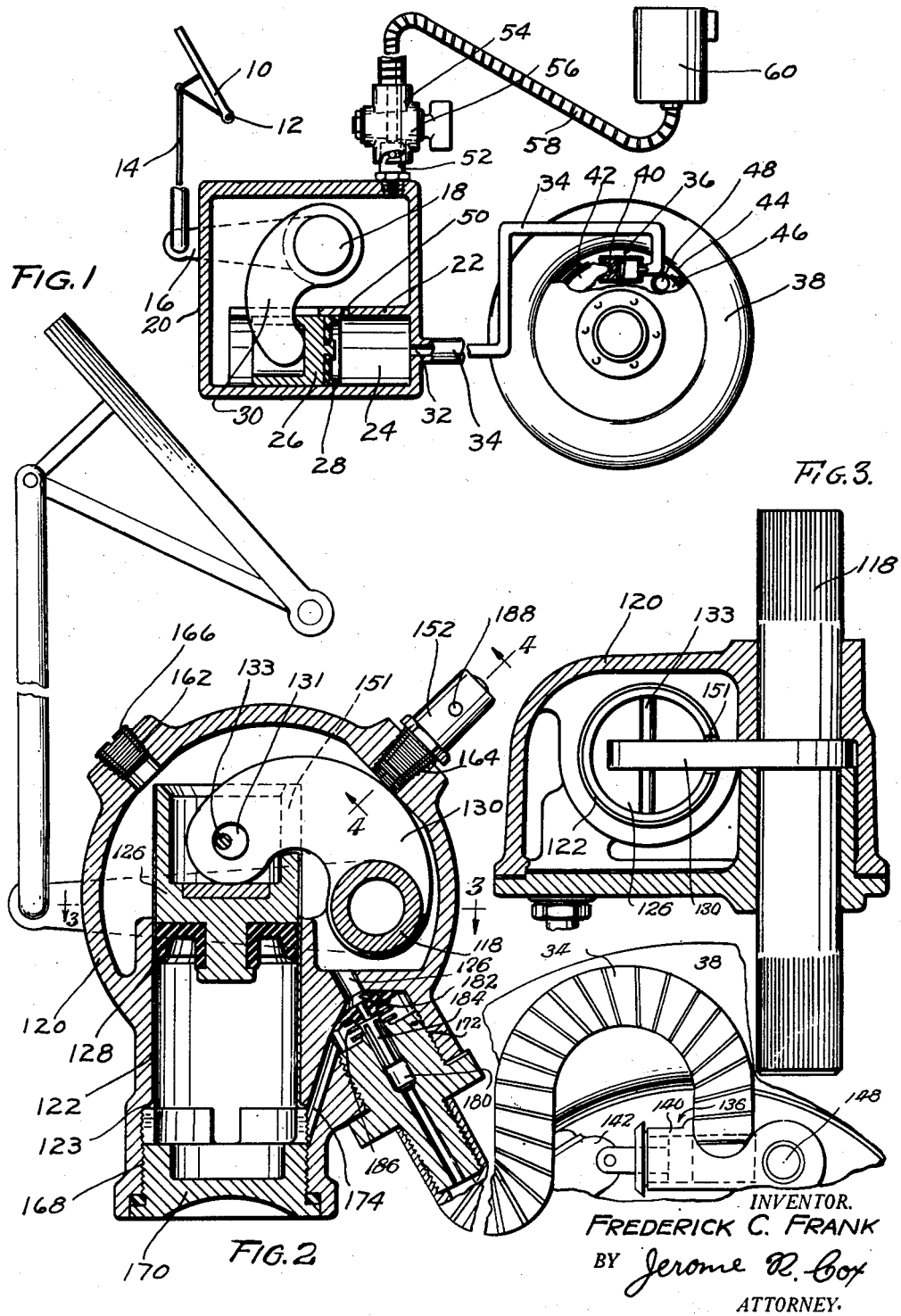

INVENTOR.
FREDERICK C. FRANK
BY Jerome R. Cox
ATTORNEY.

July 23, 1940.　　　　F. C. FRANK　　　　2,208,575

MASTER CYLINDER FOR BRAKES

Original Filed June 22, 1934　　4 Sheets-Sheet 3

INVENTOR.
FREDERICK C. FRANK
BY Jerome R. Cox
ATTORNEY.

July 23, 1940. F. C. FRANK 2,208,575
MASTER CYLINDER FOR BRAKES
Original Filed June 22, 1934 4 Sheets-Sheet 4
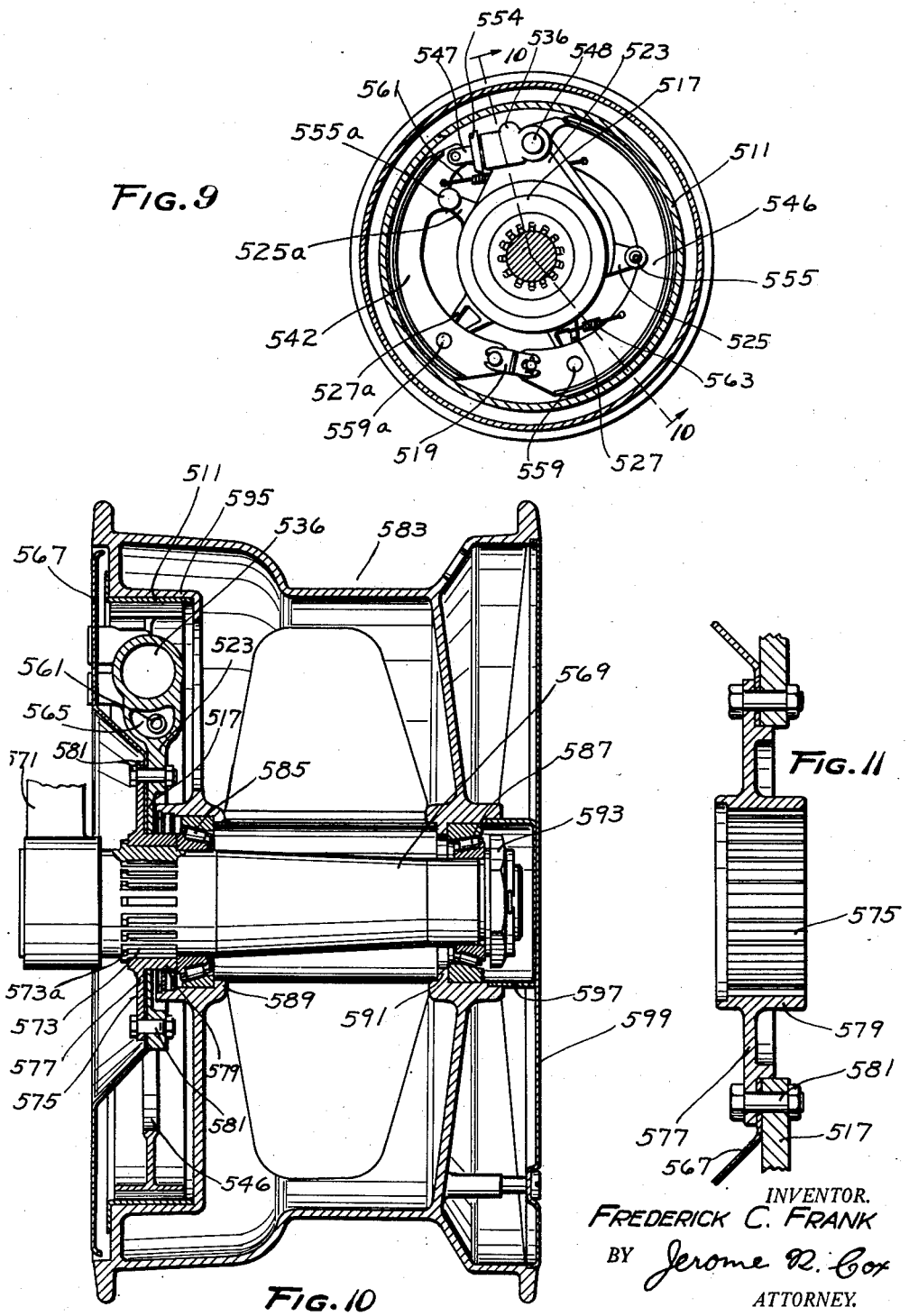
INVENTOR.
FREDERICK C. FRANK
BY Jerome R. Cox
ATTORNEY.

Patented July 23, 1940

2,208,575

UNITED STATES PATENT OFFICE 2,208,575

MASTER CYLINDER FOR BRAKES

Frederick C. Frank, South Bend, Ind., assignor to Bendix Products Corporation, South Bend, Ind., a corporation of Indiana Application June 22, 1934, Serial No. 731,939
Renewed March 13, 1939

2 Claims. (Cl. 60—54.6)

This application relates to hydraulic braking systems and is illustrated by a braking system particularly adapted for use with airplanes.

One of the objects of this invention is the provision of a braking system for airplanes which is very simple and economical to design and build.

A further object of the invention is the provision in such a system of satisfactory means for compensating for changes in the volume of the liquid used therein which may arise due to leaks and changes in temperature.

A further object of the invention is the decrease in the cost of construction while attaining greater accuracy in the formation of co-operating cylinders and pistons used in such systems.

A further object of the invention is the provision of means for closing a portion of the brake system whenever the airplane is in inverted position in order that the liquid being used may be prevented from flowing out.

One of the features of my invention is the provision of liners for the cylinders whereby a large portion of the machining of the cast parts of the cylinders may be avoided.

A further feature is the design of the supporting members for the brake shoes and wheel cylinders, especially in that there is provided a brake flange arranged to be shrunk upon the axle of the wheel associated therewith.

A further object is the provision of a pair of shoes connected with each other and arranged to anchor adjacent to the wheel cylinder, one of said shoes being arranged to actuate the other and being itself actuated by said wheel cylinder.

Further features and objects of the invention will be apparent after a reading of the subjoined specification and claims and after a consideration of the accompanying drawings, in which:

Figure 1 is a view partly diagrammatic, partly in elevation, and partly in section illustrating my invention, but having some parts broken away for clearness;

Figure 2 is a similar view illustrating a modified embodiment of my invention;

Figure 3 is a view in section taken substantially on the line 3—3 of Figure 2;

Figure 9 is a view similar to Figure 7 on a somewhat smaller scale showing a modified form of wheel;

Figure 10 is a view on an enlarged scale and in section of the wheel shown in Figure 9, being taken substantially on the line 10—10 of Figure 9; and Figure 11 is a fragmentary view in section showing a portion of the structure shown in Figure 9, with the axle removed.

Figure 4:
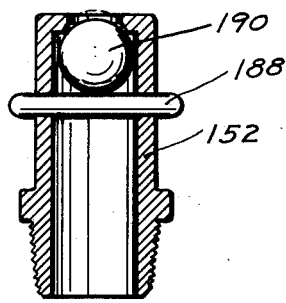
Figure 4 is a view in section and on an enlarged scale of a detail of Figure 2, taken substantially on the line 4—4 of Figure 2.

Referring particularly to the structure shown in Figure 1, it may be seen that there is illustrated a brake pedal 10 pivoted upon a rudder pedal 12. The pedal 10 is connected by a link 14 with a lever 16 adapted to rotate the shaft 18 of the master cylinder 20. The master cylinder 20 is provided with a partition 22 which defines a cylindrical space 24 in which the master piston 26, equipped with the sealing cup 28, is adapted to move. The shaft 18 is provided within the master cylinder 20 with an arm or lever 30 which contacts with the piston 26 and is thus adapted to exert pressure upon the liquid and thus to transmit pressure to the brakes.

The cylinder 24 is provided with a port 32, to which there is connected a conduit 34 leading to a wheel cylinder 36. The wheel cylinder 36 is mounted on a backing plate of a landing wheel 38. The wheel cylinder may be provided with a piston 40 contacting with one end of a brake shoe 42 and adapted to urge said shoe into contact with the drum 44. The shoe 42 may be connected with the secondary shoe 46, which may be pivotally anchored at 48 adjacent to the cylinder 36.

Means may be provided for replenishing the liquid maintained between the piston 26 and the piston 40. The portion of the master cylinder 20 outside of the partition 22 forms a reservoir in which excess liquid is normally stored. The partition 22 is provided with a compensating port such as 50 through which liquid may flow freely whenever the parts are in their normal released position, as shown.

Means may be provided for replenishing the liquid in the storage reservoir so formed in the master cylinder. To this end, I have designed a nipple 52 to which there may be fastened a bayonet coupling 54 provided with a shut-off valve 56 and connected by means of a flexible hose 58 with a can 60 for supplying additional liquid when required.

The system shown in Figures 2, 3, 4, 7 and 8 is similar to that shown in Figure 1 and similar parts are designated by the same numerals with the addition of 100.

The master cylinder shown in Figures 2, 3 and 4 is formed of a casting 120 provided with a liner sleeve 122 securely fastened therein and with a piston 126. The sleeve 122 is positioned to extend vertically within the casting 120 and is provided with a slot 151 in which an arm 130 secured to the shaft 118 is adapted to move so as to actuate the piston 126. The arm 130 is formed at its outer end with a hole 131 and a pin 133 extending through said hole connects the arm with the piston 126. The casting 120 is also provided with a pair of threaded openings 162 and 164. The former is provided with a plug 166 which may be removed for the purpose of bleeding air from the apparatus. The bore 164 is provided with a bayonet coupling nipple 152 for purposes previously mentioned in connection with the description of Figure 1.

The casting 120 is also formed with an opening 168 so arranged that the liner 122 may be inserted therein. This opening is normally closed by means of a plug 170, which also serves to secure the liner 122 in the desired position. By the provision of the liner 122, the master cylinder is more easily and cheaply constructed, inasmuch as it becomes unnecessary to machine the casting so accurately as would otherwise be necessary in order that the piston 126 might fit tightly therein. It may be seen that the liner 122 is provided with a flange 123 by means of which the plug 170 secures it firmly in place.

The casting 120 is provided also with an outlet opening 172 which is connected by means of a bore 174 with a portion of the casting below the piston 126 and by means of a bore 176 with a portion of a casting forming a reservoir above the piston 126. The opening 172 is normally closed by a plug 178 formed with central bores 180 and 181 adapted to be connected (through a conduit such as the conduit 34) with the wheel cylinder. By means of the arrangement, liquid pressure may be transmitted from the master cylinder to the wheel cylinders.

In order to prevent the passage of liquid from the bore 174 through the bore 176 to the space used as a reservoir, a valve 182 provided with a stem 184 is positioned to close the entrance to the bore 176. The stem 184 extends within the bore 180 and a spring 186 normally maintains the valve in contact with its seat.

The nipple 152 is provided with a pin 188 by means of which the bayonet coupling may be attached thereto. Arranged in the outer end of the nipple is a ball check valve 190 (see Figure 4). By means of this arrangement, the liquid within the reservoir formed by the upper part of the casting 120 is normally maintained under atmospheric pressure and is always under atmospheric pressure when it is necessary to apply the brakes. However, when the airplane is flying in an inverted position, the ball 190 moves to close the opening at the upper end of the nipple 152 and prevents the liquid in the reservoir from flowing out.

Figure 5:
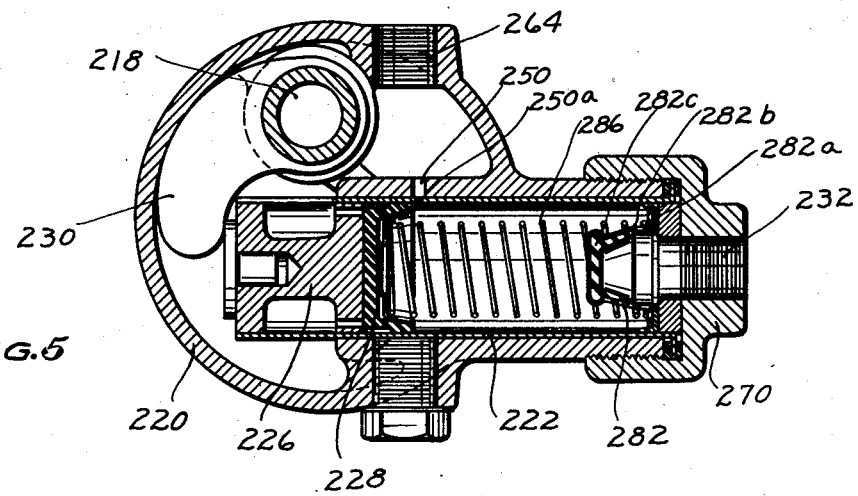
Figure 5 is a view in section of a modified form of master cylinder.

In the modified form of master cylinder shown in Figure 5 a casting 220 somewhat similar to the casting 120 is used, but the sleeve 222 is arranged horizontally and a cap 270 is provided formed with an opening 232 adapted to be connected by a conduit with the wheel brakes. Within the sleeve 222 there is positioned a piston 226 provided with a sealing cup 228. At the forward end of said sleeve 222, there is arranged a valve 282 arranged to allow the substantially free passage of liquid forward from said master cylinder through the outlet 232, but arranged to prevent the return flow of liquid except under a pressure greater than a predetermined minimum. This valve is formed of a rubber disk 282$^a$, a metallic cage 282$^b$, and a rubber insert 282$^c$. The cage 282$^b$ is formed with openings through which liquid may pass forward by flexing the edges of the insert 282$^c$, but through which liquid cannot pass in the return direction because the edges of the insert seal the openings. A spring 286 bears at one end upon a guide element 286$^a$ seated within the sealing cup 228 and at the opposite end bears on a flange formed upon the metallic cage 282$^b$. Thus the spring 286 maintains the cage 282$^b$ upon its seat on the disk 282$^a$ until the pressure of the liquid returning from the brakes exceeds the pressure of the spring 286, whereupon the cage 282$^b$ is lifted from its seat on the washer 282$^a$ and liquid is allowed to escape back into the master cylinder.

The piston 226 is adapted to be actuated by an arm 230 secured to a shaft 218 and ports 250 and 250$^a$ formed in a support for the sleeve 222 and in the sleeve 222 itself respectively are adapted to allow liquid to flow in and out of the sleeve when the apparatus is in its normal released position in order to compensate for leakage and changes in temperature. An opening 264 is arranged for the reception of a filling nipple which, if desired, may be of the type shown in Figure 5.

Figure 6:
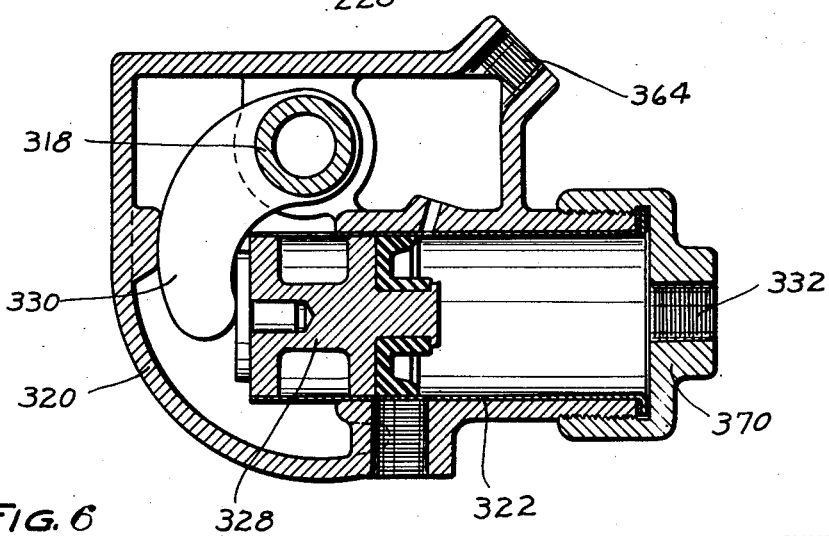
Figure 6 is a view in section of another modified form of master cylinder.

In the modified form shown in Figure 6, the casting 320 is equipped with a sleeve 322 and with a piston 328 arranged within the sleeve. The piston is adapted to be actuated by an arm 330 secured to a shaft 318. The forward end of the master cylinder is equipped with a cap 370 having an opening 332 to which may be connected a conduit leading to the brakes. The opening 364 is arranged for the reception of a filling nipple.

Figure 7:
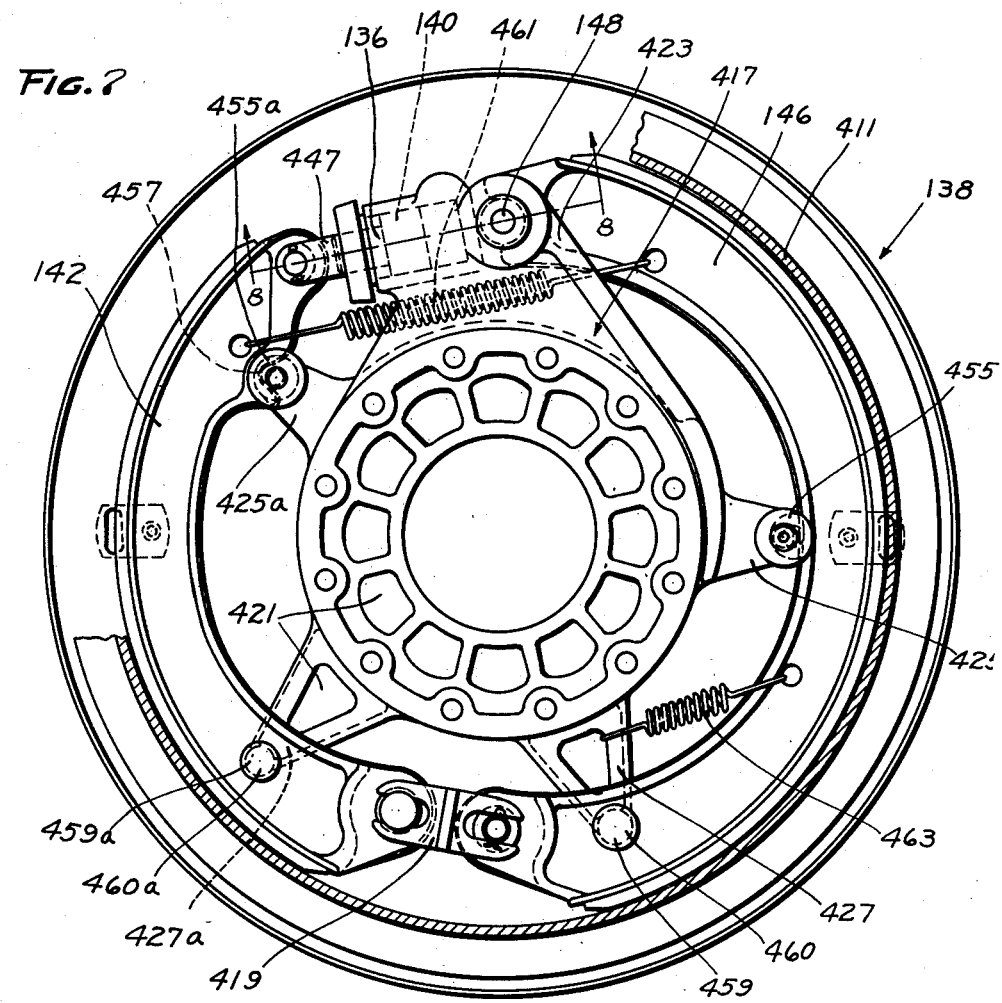
Figure 7 is an enlarged view in elevation of the wheel structure which is shown more or less diagrammatically in Figure 2, some parts being removed for clearness.
Figure 8:
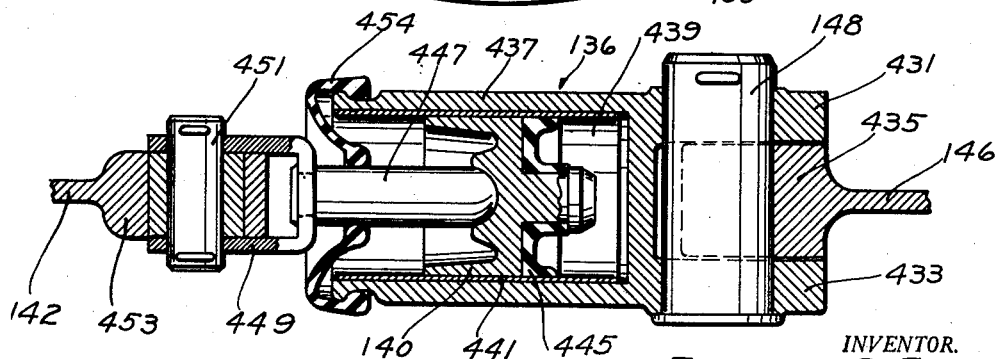
Figure 8 is an enlarged view in section of the wheel cylinder shown in Figure 7, being taken substantially on the line 8—8 of Figure 7.

The wheel and wheel brake structure of Figure 2 are shown more clearly in Figures 7 and 8. This structure is somewhat similar to the structure disclosed in my copending application Serial Number 723,789 which has issued April 21, 1936 as Patent Number 2,038,213 and the arrangement of the central cast spider formed with the integral applying cylinder and with integral arms serving to anchor the brake members, to position the brake members radially of the drum, and to determine the released position of the brake members is intended to be claimed in said copending application, as is also the combination of such a cast member with a stamped portion such as is shown more particularly in the embodiment disclosed in Figures 9, 10 and 11.

The brake generally designated 138 comprises a drum 411, brake shoes 142 and 146 and a supporting member or backing plate for the brake shoes generally designated 417.

The shoes 142 and 146 are connected by means of an adjustable link 419. The shoe 146 is pivotally supported at one end (the upper end in Figure 7) upon the anchor 148 for the shoes as will be later more fully described. The shoe 142 is supported only by its connection with the shoe 146 and by a connection with the applying piston 148 of the hydraulic wheel cylinder 136.

The supporting member 417 comprises a light weight casting made of some suitable material such as aluminum and formed with a plurality of holes such as 421 by reason of which the casting has less weight than it would otherwise. The casting is provided with five arms each extending radially outward and designated by the numerals 423, 425, 425ᵃ, 427 and 427ᵃ respectively. The arm 423 carries the anchor pin 148 which extends through holes formed in yoke members 431 and 433 (as may be seen most clearly in Figure 8). As is also seen in said figure, the web of the shoe 146 is provided with an enlarged end 435 through which the pin 148 also extends. Adjoining the yoke 431—433, the arm 423 has formed a cylindrical shell 437 with an opening 439 in which there is positioned a stamped sleeve 441. The shell 437 together with the sleeve 441 form the cylinder 136. There is provided within the sleeve 441 a piston 148 carrying a rubber cup sealing member 445 on its inner face. Piston rod 447 is secured to a yoke member 449 which is fastened by a pin 451 to an enlarged portion 453 of the web of the shoe 142.

The arms 425 and 425ᵃ are provided with rollers 455 and 455ᵃ which serve to determine the released position of the brake shoes. It is to be noted that the shoe 142 has its inner surface formed with a grooved recess 457 so that the associated roller 455ᵃ may exactly determine the return position of the shoe.

The arms 427 and 427ᵃ carry pins 459 and 459ᵃ which extend through the webs of the associated shoes. The pins 459 and 459ᵃ are provided with spring pressed cap members such as 460 and 460ᵃ serving to determine the lateral position of the shoes within the drum.

Springs 461 and 463 serve to release the shoes from the drum when the brake applying pressure in the cylinder 439 is released.

The modification shown in Figures 9, 10 and 11 is similar to the structure shown in Figures 7 and 8. There is provided a drum 511 with which there are associated brake shoes 542 and 546. The shoes are similarly connected by an adjustable link 519 and there is provided a cast spider 517. The spider 517 is formed with arms 523, 525, 525ᵃ and 527 and 527ᵃ. The arms 525 and 525ᵃ are provided with rollers 555 and 555ᵃ for determining the released position of the shoes and the arms 527 and 527ᵃ are provided with spring pressed steady rests 559 and 559ᵃ for determining the lateral position of the shoes. The arm 523 is provided with an anchor pin 548, and a cylinder 536 cast integrally therewith. The cylinder is provided with a piston, not shown, connected by a piston rod 547 with the applying end of the shoe 542. Dust cap 554 is also provided for the end of the cylinder. As is shown more clearly in Figure 11 the arm 523 is formed with a passage way 565 through which the spring 561 extends. The shoe 546 is connected to the arm 527 by a spring 563 which together with the spring 561 connected to the upper ends of the shoes 542 and 546 serves to return the shoes to their released position when the brake applying force is withdrawn.

As may be seen most clearly in Figure 10, the spider 517 together with the cylinder 536 is positioned exactly in the central plane of the shoes and the brake drum. The spider 517 carries a light stamped plate 567 which serves to prevent the entrance of dirt into the drum and which together with the spider forms the backing plate for the brake.

My improved arrangement by which the various parts of the brake are secured to the wheel and to the axle may be seen most clearly in Figures 9, 10 and 11. The stub axle 569 which carries a supporting part of the airplane or other vehicle is formed with a plurality of integral spline elements such as 573 having radial projections 573ᵃ. I provide a collar 575 formed with a brake mounting flange 577 and a bearing spacer sleeve 579. The interior of the sleeve is formed so as to complement the splines 573 and thus the collar 575 is non-rotatably secured to the stub axle 569. The casting 517 and the plate 567 are secured to the brake mounting flange 577 by bolts 581. Thus the stator members of the brake including the spider 517, the brake applying cylinder 536, the anchor 548 mounted on said spider, the brake shoes 542 and 546 supported by the anchor, the cylinder 536, and the dirt protecting cover 567 are all non-rotatably secured to the stub shaft 569.

The stud shaft 569 is supported by a small diameter wheel generally designated 583. This wheel 583 is formed almost entirely in one piece, but is hollow and is formed with openings wherever possible in order to decrease the weight. Interposed between the wheel and the axle are bearings 585 and 587. The former is positioned between the edge of the sleeve 579 and a flange 589 formed as a portion of the wheel 583. The bearing 587 is positioned between a flange 591 similarly formed as a part of the wheel 583 and a nut 593 screwed upon the outer end of the shaft 569. Thus the collar 575, the bearings 585 and 587, and the wheel 583 are clamped between the radial projections 573ᵃ on the splines 573 and the nut 593. This obviously holds the sleeve 575 and with it the stator parts of the brake against lateral movement as well as against movement of rotation on the stub shaft 569 and holds the wheel 583 against lateral movement on said shaft while allowing rotation thereof.

The wheel 583 has formed integrally therewith a drum shaped portion 595 within which there is positioned the separate drum 511 as a liner. The outer side of the wheel 583 is closed by a cap member 597 and a fairing plate 599.

It is believed that the operation of the structure disclosed would be obvious from the above description. In each of the modifications the operation is the same and the description of the operation of the structure shown in Figure 1 may be applied to all structures. Therein the operator presses upon the pedal corresponding to the pedal 18 and thus moves the master cylinder piston 26. This movement forces fluid through the conduit to the wheel cylinder and thus forces the piston 48 outwardly to apply the shoe 42 to the drum. The movement of the drum carries the shoe around and thus applies the shoe 46 to the drum. Both shoes anchor upon the anchor 48 and the spider transmits the braking torque to the axle of the vehicle. When the braking pressure is released the springs corresponding to the springs 461 and 463 withdraw the shoes from their contact with the drum and the braking action is thus released.

It is to be understood that the above-described embodiments of my invention are for the purpose of illustration only and various changes may be made therein without departing from the spirit and scope of the invention.

I claim:

1. For a hydraulic braking system, a liquid pressure creating device comprising a casting having a cylindrical portion, and having a passage leading from one end of the cylinder portion, a passage formed with a conical valve seat leading from a portion of the casting to connect with first named passage and the outer end of said second named passage being provided with a plug formed with a bore connected with the brakes, a piston movable in said cylindrical portion between the portion of the casting to which the second named passage connects and the first named passage, a shaft extending through said casting transversely of the axis of said cylindrical portion, a lever secured to said shaft and having a portion acting upon said piston, a valve interposed in said last named passageway, comprising a conical member having a stem extending outwardly from said valve seat, and a spring bearing at one end on said plug and at the other end of said conical valve member and surrounding said stem.

2. For a hydraulic braking system, a liquid pressure creating device comprising a casting having a cylindrical portion provided with a thin cylindrical liner, said liner extending beyond said cylindrical portion and being supported by said cylindrical portion only at the parts where pressure is exerted, a trunk piston having a head and a skirt movable in said cylindrical liner, a shaft extending through said casting transversely of the axis of said cylindrical portion, and a lever secured to said shaft and having a portion acting upon the head of said piston, the liner and the skirt of said piston being formed with a groove so that upon rotation of the lever it may extend downward into the cylindrical portion.

FREDERICK C. FRANK.